May 30, 1967  A. M. SENKEWICH  3,321,792
WINDSHIELD WIPER WITH HOT AIR
Filed Jan. 18, 1965
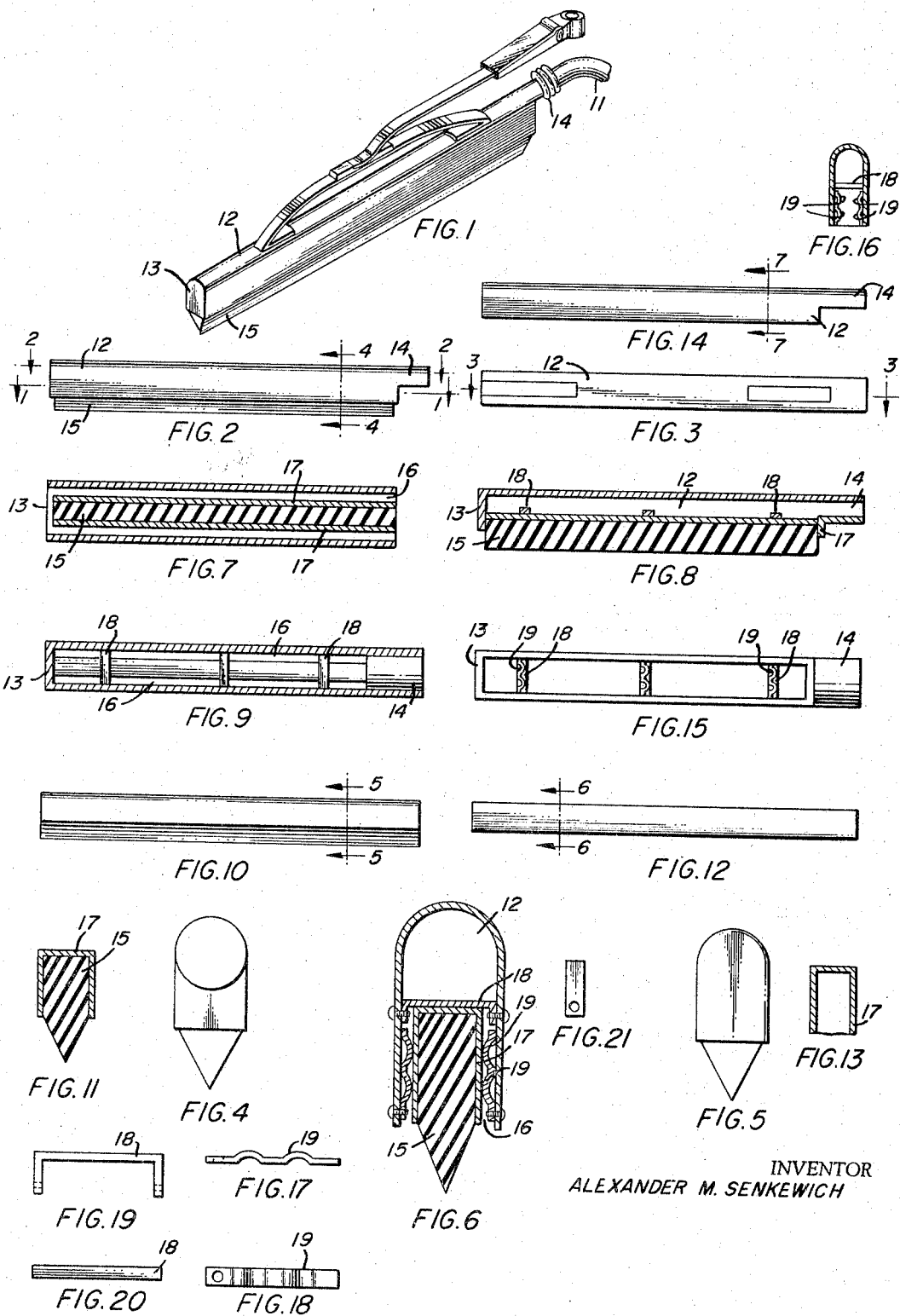
INVENTOR
ALEXANDER M. SENKEWICH

United States Patent Office 3,321,792
Patented May 30, 1967

3,321,792
WINDSHIELD WIPER WITH HOT AIR
Alexander M. Senkewich, New York, N.Y., assignor of five percent to James M. Heilman, Rye, and five percent to Marjorie Kingston, Flushing, N.Y.
Filed Jan. 18, 1965, Ser. No. 426,029
1 Claim. (Cl. 15—250.04)

With the coming of the cold weather and frosts, the front windshield of the car presents the driver with two following major inconveniences:

(1) Fogging of the windshield from the inside. The visibility in this case is significantly reduced and the driver is forced almost constantly to wipe the windshield. This he does while the car is moving, controlling the steering wheel with only one hand, and, what is more important, his attention is distracted for a few moments from the road while he is busy cleaning the windshield. This circumstance may lead to an accident.

(2) The second inconvenience for the driver is the windshield during freezing weather when the outside of the windshield is covered with frost or a thin layer of ice, which also reduces the visibility.

To eliminate these two inconveniences, I propose to make a windshield wiper in the form of an almost closed elongated box—air collector—into which hot air enters. This air has only one outlet from the air collector—two minute openings situated below on both sides of the rubber wiper, intended, as at the present time, for windshield cleaning. Thus during the operation of the windshield wiper, one can turn on the hot air which enters the air collector and from where the windshield will be hit directly by a pressure jet through the minute openings at the bottom of the rubber wiper.

The hot air will defrost the windshield from the outside and will eliminate the fogging from the inside since the entire windshield wiper warms up quickly. The above mentioned minute openings extend along the entire length of the air collector. Referring to the figures, it will be seen that:

FIG. 1 is a perspective view of the automobile windshield wiper. Here is shown the elongated box—the air collector with the rubber wiper, the existing clamping mechanism and a portion of the pipe supplying the hot air to the collector.

FIG. 2 is a front view of the air collector with the rubber wiper only.

FIG. 3 is a plane view of the same
FIG. 4 is a right side view of the same.
FIG. 5 is a left side view of the same.
FIG. 6 is an enlarged cross-section on the line 4—4 of the same.
FIG. 7 is a top view of the section on the line 1—1.
FIG. 8 is a front elevation view section on the line 3—3.
FIG. 9 is a top view of the section on the line 2—2.
FIG. 10 is a front view of the rubber.
FIG. 11 is a cross-section on the line 5—5.
FIG. 12 is a front view of the rubber wiper housing.
FIG. 13 is a cross-section of the same on the line 6—6.
FIG. 14 is a front view of the box—air collector.
FIG. 15 is a bottom view of the same.
FIG. 16 is a cross-section on the line 7—7 of the same.
FIG. 17 is a front view of the spring clamp.
FIG. 18 is a plane view of the same.
FIG. 19 is a front view of the plank serving as an upper support for the rubber wiper.
FIG. 20 is a plane view of the same.
FIG. 21 is a side view of the same.

The air collector consists of an elongated box closed from the top, from both sides and from one end. The bottom and the upper portions of the front end remain open (see FIGS. 2, 3, 4, 5, 14, 15 and 16).

The top portion of the front end has a circular section 14, onto which a light flexible pipe 11 is fitted carrying hot air into the air collector. FIG. 1 the bottom of this air collector is open and into it a rubber wiper 15 (see FIG. 6) which cleans the windshield is fitted. In order for the rubber wiper to be held on a fixed level, three stops 18 (see FIGS. 19 and 20) are fastened inside the collector. Thus, when the rubber wiper is inserted into the collector, it will not go past the stops 18 (FIG. 6). In order that the rubber wiper be firmly held in the air collector, inside it three spring clamps 19 are fastened to each of the two side walls (FIGS. 17 and 18). These clamps are fastened under the stops 18. Before the rubber wiper is inserted into the air collector, a housing made for example from a thin tin plate is tightly fitted over the right angle portion of it. Thus, the windshield wiper inserted into the air collector will come up to the stops 18 from one side, and will be firmly held on the sides by the spring clamps 19 from the other side. Along the entire length of the air collector, between the housing of the rubber wiper and the side wall of the collector, on both sides of it there remains a minute opening 16 (see FIG. 9) whose width corresponds to the thickness of the spring clamp 19. The hot air from the air collector passes through these minute openings directly onto the windshield. Thus, the work scheme of the windshield wiper propsed by me consists of the following. The hot air is fed into the air collector 12 through the light flexible pipe 11 (see FIG. 1). From the collector 12, the hot air, under pressure, passes through the openings 16 directly onto the windshield. As evident from the above mentioned, along the entire length of the air collector there are two minute openings and a rubber wiper between them. Thus, during the operation, there will always be a jet of hot air striking the windshield from the front of the rubber wiper and from beind it, irrespective of the direction of turning of the windshield wiper.

The hot air enters the air collector from a chamber common to all automobiles in which the air is heated for the warming of the automobile. Thus, by the action of a switch, the hot air is directed either for the warming of the automobile or into the air collector for the warming of the front windshield. This air enters the air collector under pressure which corresponds to the power of the chamber fan. The defroster presently applied does not fully serve its purpose since the air in this case is dispersed, especially during the motion of the automobile. With the application of my windshield wiper, however, the hot air strikes directly the total area of the windshield, which is swept by the windshield wiper during its operation.

I claim:

A combined windshield wiper and defroster comprising a wiper blade, an air collector casing having a series of spaced stops positioned throughout its length, corrugated spring means secured to said spaced stops to form a U and extending toward the outer edge of said air collector casing, said wiper blade being positioned in the bight of said U and removably retained therein by said corrugated spring means, and an air tube extending from heating means to said air collector casing whereby the air may circulate on both sides of said wiper blade throughout substantially its entire length.

References Cited

UNITED STATES PATENTS

| 1,755,059 | 4/1930 | Gallagher | 15—250.04 |
| 1,833,307 | 11/1931 | Riggs | 15—250.07 |

FOREIGN PATENTS

| 454,784 | 1/1929 | Germany. |

CHARLES A. WILLMUTH, *Primary Examiner.*